United States Patent
Boeke et al.

(10) Patent No.: US 10,115,217 B2
(45) Date of Patent: Oct. 30, 2018

(54) LAYERING ANIMATION PROPERTIES IN HIGHER LEVEL ANIMATIONS

(75) Inventors: Ruurd Johan Boeke, Redmond, WA (US); Hamid Mahmood, Seattle, WA (US); Terry A. Adams, North Bend, WA (US); Michael John Hillberg, Beaux Arts, WA (US); Brendan J. Clark, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 514 days.

(21) Appl. No.: 13/284,623

(22) Filed: Oct. 28, 2011

(65) Prior Publication Data

US 2013/0106866 A1 May 2, 2013

(51) Int. Cl.
*G06T 13/00* (2011.01)

(52) U.S. Cl.
CPC .................... *G06T 13/00* (2013.01)

(58) Field of Classification Search
None
See application file for complete search history.

(56) References Cited

U.S. PATENT DOCUMENTS

| | | |
|---|---|---|
| 5,261,041 A | 11/1993 | Susman |
| 5,548,693 A | 8/1996 | Shinya |
| 5,680,619 A | 10/1997 | Gudmundson et al. |
| 6,018,741 A | 1/2000 | Howland |
| 6,204,828 B1 | 3/2001 | Amir et al. |
| 6,266,053 B1 | 7/2001 | French et al. |
| 6,314,439 B1 | 11/2001 | Bates et al. |
| 6,323,884 B1 | 11/2001 | Leonard et al. |
| 6,359,625 B1 | 3/2002 | Perego |

(Continued)

FOREIGN PATENT DOCUMENTS

| | | |
|---|---|---|
| CN | 1613057 | 5/2005 |
| CN | 101223555 | 7/2008 |

(Continued)

OTHER PUBLICATIONS

Microsoft Developer Network, CombineRgn, Apr. 28, 2010, Microsoft, http://msdn.microsoft.com/en-us/library/aa922002.aspx.*

(Continued)

*Primary Examiner* — Xiao Wu
*Assistant Examiner* — Mohammad H Akhavannik
(74) *Attorney, Agent, or Firm* — Workman Nydegger

(57) ABSTRACT

Embodiments are directed to rendering animations in a multi-layered animation system and to rendering an element with an animation that uses multiple levels of animation properties. In one scenario, a computer system establishes an operating system (OS)-specified animation value for at least one property of a user interface (UI) element that is to be animated. The computer system receives a user-specified animation value for at least one property of the UI element that is to be animated and determines, based on the UI element property, how to combine the OS-specified animation value and the user-specified animation value. The computer system then combines the OS-specified animation value and the user-specified value for the UI element in the determined manner and renders the animation for the element using the combined animation values.

20 Claims, 4 Drawing Sheets

(56) References Cited

U.S. PATENT DOCUMENTS

| | | | |
|---|---|---|---|
| 7,477,254 | B2 | 1/2009 | Nelson et al. |
| 8,086,963 | B2 | 12/2011 | Collins |
| 8,120,610 | B1 | 2/2012 | Stratton |
| 8,365,141 | B1 | 1/2013 | Yan |
| 8,464,173 | B2 | 6/2013 | Victor |
| 2003/0076328 | A1 | 4/2003 | Beda et al. |
| 2004/0125131 | A1 | 7/2004 | Phelps |
| 2005/0213041 | A1 | 9/2005 | Schmelzer |
| 2006/0047804 | A1 | 3/2006 | Fredricksen et al. |
| 2006/0085745 | A1 | 4/2006 | Anderson et al. |
| 2006/0109242 | A1 | 5/2006 | Simpkins |
| 2006/0236257 | A1 | 10/2006 | Othmer et al. |
| 2007/0013699 | A1 | 1/2007 | Nelson et al. |
| 2008/0030504 | A1* | 2/2008 | Brunner et al. ............... 345/473 |
| 2009/0064012 | A1 | 3/2009 | Tremblay |
| 2010/0077345 | A1 | 3/2010 | Swingler et al. |
| 2010/0188410 | A1 | 7/2010 | Gilbert et al. |
| 2010/0235793 | A1 | 9/2010 | Ording et al. |
| 2010/0333039 | A1 | 12/2010 | Denkel |
| 2011/0087977 | A1 | 4/2011 | Campney et al. |
| 2011/0099492 | A1 | 4/2011 | Park et al. |
| 2012/0069231 | A1 | 3/2012 | Chao |
| 2013/0067372 | A1 | 3/2013 | Boeke et al. |
| 2013/0106885 | A1 | 5/2013 | Clark et al. |
| 2013/0335425 | A1* | 12/2013 | Haase ........................... 345/473 |

FOREIGN PATENT DOCUMENTS

| | | |
|---|---|---|
| CN | 101651738 | 2/2010 |
| CN | 101980191 | 2/2011 |
| EP | 1326210 | 10/2003 |

OTHER PUBLICATIONS

Microsoft Developer Network, UIElement.Opacity Property, Jul. 23, 2010, Microsoft, http://msdn.microsoft.com/en-us/library/system.windows.uielement.opacity.aspx.*

"Animation Layers (Layer Controller)", Retrieved on: Aug. 16, 2011, Available at: http://docs.autodesk.com/3DSMAX/13/ENU/Autodesk%203ds%20Max%202011%20Help/index.html?url=./files/WSf742dab041063133-128e6f4112a1ce6c39-7fd1.htm,topicNumber=d0e177596.

"What Is Core Animation?", Retrieved on: Aug. 16, 2011, http://developer.apple.com/library/ios/#documentation/Cocoa/Conceptual/CoreAnimation_guide/Articles/WhatisCoreAnimation.html#//apple_ref/doc/uid/TP40004689-SW1.

"Animating in a Layer", Retrieved on: Aug. 16, 2011, Available at: http://softimage.wiki.softimage.com/xsidocs/animlayers_AnimatinginaLayer.htm.

Savoye, et al., "Multi-Layer Level of Detail for Character Animation", In Proceedings of Workshop in Virtual Reality Interactions and Physical Simulation, 2008, 10 pages.

Second Office Action in the Chinese patent application No. 201210331159.2, dated Oct. 8, 2015. 7 pages.

Supplementary European Search Report Issued in European Patent Application No. 12829874.2, dated Aug. 7, 2015, 6 pages.

First Office Action and Search Report Issued in Chinese Patent Application No. 201210331159.2, dated Feb. 4, 2015, 15 pages.

"Animation in Alias" retrieved on Aug. 17, 2011. Available at: http://www.autodesk.com/techpubs/aliasstudio/2010/index.html?url=WS1a9193826455f5ff4e42-1d7d11bf108001d-694b.htm,topicNumber-d0e47156.

"Canvas Animations in HTML5," Retrieved on Aug. 17, 2011. Available at: http://www.wintellect.com/CS/blogs/jprosise/archive/2011/04/03/canvas-animations-in-html5.aspx.

"Core Animation—The Animator Proxy" Retrieved Aug. 17, 2011. Available at: http://www.ottersoftwareblog.com/blog/2010/5/23/core-animation-the-animator-proxy.html.

"Chapter 3: Controls and XAML", Published Dec. 2003, available at: http://msdn.microsoft.com/en-us/library/aa479869.aspx.

"Silverlight for Windows Embedded Graphics and Rendering Pipeline", published Mar. 2011, Available at: http://download.micorsoft.com/download/2/4/A/24A366661-A629-4CE6-A615-6B2910A1367A/Silverlight%20for&20Windows%20Embedded%20Graphics%20and%20Rendering%20Pipeline.pdf.

U.S. Appl. No. 13/287,654, Nov. 21, 2013, Office Action.
U.S. Appl. No. 13/229,586, Jan. 30, 2014, Office Action.
U.S. Appl. No. 13/229,586, Jun. 25, 2014, Final Office Action.
U.S. Appl. No. 13/287,654, Jul. 2, 2014, Final Office Action.
U.S. Appl. No. 13/229,586, Nov. 18, 2014, Office Action.
U.S. Appl. No. 13/229,586, May 29, 2015, Final Office Action.
U.S. Appl. No. 13/287,654, Jun. 17, 2015, Office Action.
U.S. Appl. No. 13/229,586, Nov. 19, 2015, Office Action.
U.S. Appl. No. 13/287,654, Feb. 3, 2016, Final Office Action.
U.S. Appl. No. 13/229,586, Mar. 28, 2016, Notice of Allowance.
U.S. Appl. No. 13/287,654, Aug. 9, 2016, Office Action.

* cited by examiner

LAYERING ANIMATION PROPERTIES IN HIGHER LEVEL ANIMATIONS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

These software applications are typically designed to run on some type of operating system (OS). The OS interfaces with the computer hardware to perform the commands of the software application. The OS typically has its own, native way of handling certain operations. For instance, the OS may handle display features such as the layout of objects on the screen, or the animation of objects when an animation is triggered. In some cases, software applications may include instructions for performing an operation typically handled by the OS. In such cases, a conflict may arise as to which command will be followed: that of the OS or that of the software application.

BRIEF SUMMARY

Embodiments described herein are directed to rendering animations in a multi-layered animation system and to rendering an element with an animation that uses multiple levels of animation properties. In one embodiment, a computer system establishes an operating system (OS)-specified animation value for at least one property of a user interface (UI) element that is to be animated. The computer system receives a user-specified animation value for at least one property of the UI element that is to be animated and determines, based on the UI element property, how to combine the OS-specified animation value and the user-specified animation value. The computer system then combines the OS-specified animation value and the user-specified value for the UI element in the determined manner and renders the animation for the element using the combined animation values.

In another embodiment, a computer system establishes a transition target class that provides a limited set of animation properties that the operating system (OS) allows to be animated. The computer system attaches the transition target class to a target element that is to be animated on a software application user interface (UI). The computer system then determines that a value for an element property is to be calculated and, upon calculating the value for the element property, combines OS animation properties with the transition target class properties. The computer system then renders the target element with an animation that uses the combined OS and transition target class properties.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Figure 1:
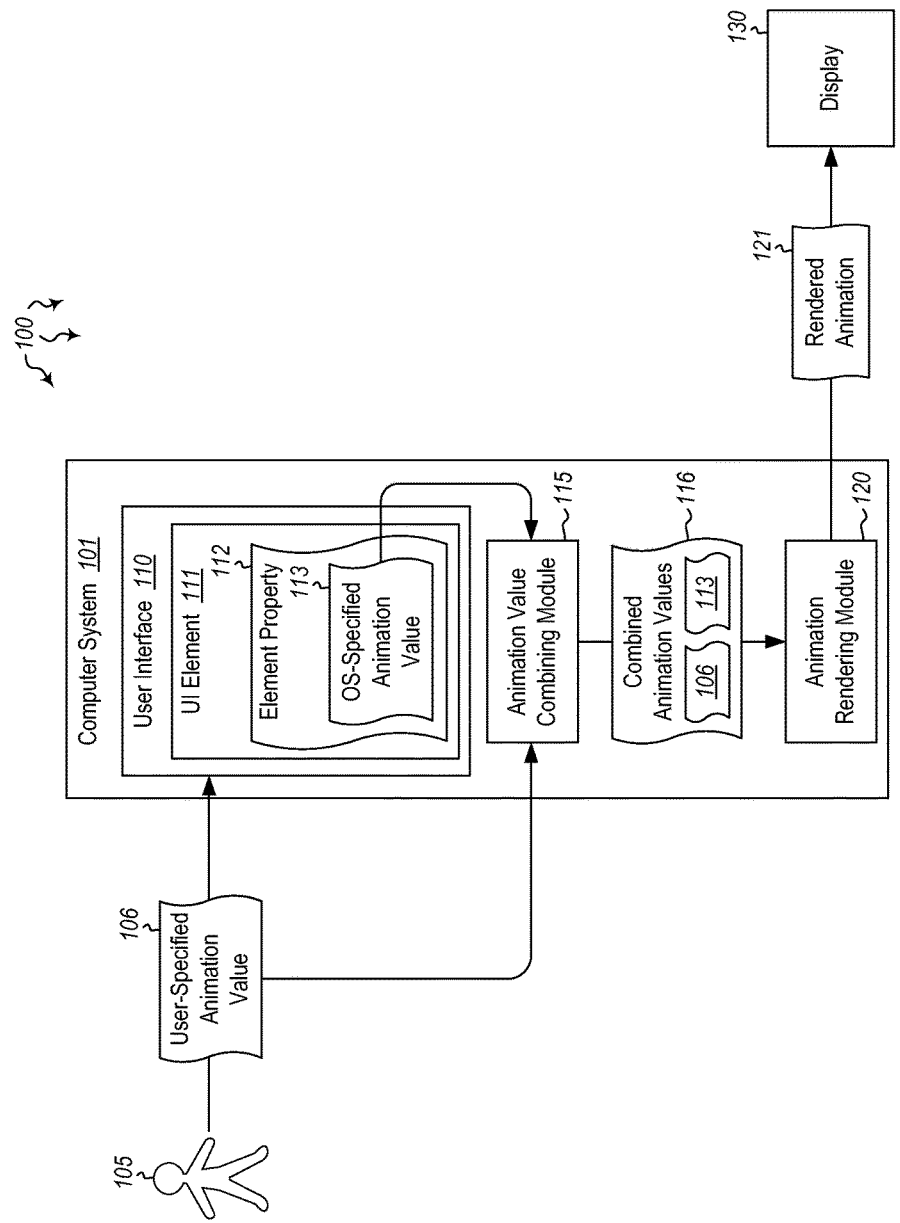
FIG. 1 illustrates a computer architecture in which embodiments of the present invention may operate including rendering animations in a multi-layered animation system and rendering an element with an animation that uses multiple levels of animation properties.

Embodiments described herein are directed to rendering animations in a multi-layered animation system and to rendering an element with an animation that uses multiple levels of animation properties. In one embodiment, a computer system establishes an operating system (OS)-specified animation value for at least one property of a user interface (UI) element that is to be animated. The computer system receives a user-specified animation value for at least one property of the UI element that is to be animated and determines, based on the UI element property, how to combine the OS-specified animation value and the user-specified animation value. The computer system then combines the OS-specified animation value and the user-specified value for the UI element in the determined manner and renders the animation for the element using the combined animation values.

In another embodiment, a computer system establishes a transition target class that provides a limited set of animation properties that the operating system (OS) allows to be animated. The computer system attaches the transition target class to a target element that is to be animated on a software application user interface (UI). The computer system then determines that a value for an element property is to be calculated and, upon calculating the value for the element property, combines OS animation properties with the transition target class properties. The computer system then renders the target element with an animation that uses the combined OS and transition target class properties.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes computer system 101. Computer system 101 may be any type of local or distributed computer system including a cloud computer system. The computer system includes a user interface 110. The user interface is configured to display various icons, menus, toolbars and other items, as well as software applications with their associated objects and elements. The user interface allows user 105 to interact with the computer system and/or software applications running on the computer system.

The user interface 110 may be an operating system (OS) user interface. The various elements 111 on the screen include element properties 112 and OS-specified animation values for each property. The animation values may specify settings or provide other indications of how the element is to be animated. For example, if an icon or application window is moved, the animation value 113 may indicate how the icon or application window is to be animated from one position to the other. As will be understood by one skilled in the art, many different element animations are possible, and these animations may be used in isolation or in combination with other animations. For example, if a shortcut icon is deleted, it may be faded away gradually, instead of just being abruptly removed. If an element is to be rearranged in a list, list items may move up, down, diagonally or in other manners. Each of these animations may be specified by the OS in the OS-specified values 113.

In some cases, a user may wish to override or modify the OS-specified animation values. Thus, for instance, user 105 may send user-specified animation values 106 to the animation value combining module 115 of computer system 101. The animation value combining module may combine animation values from the user (106) and from the operating system (113). These animation values may be combined according to predefined policy, or the user may be prompted as to how the values should be combined. The combined values may be sent to the animation rendering module 120 that renders the animation 121 with the combined values on display 130. This process will be described in greater detail below with regard to methods 200 and 300 of FIGS. 2 and 3, respectively.

Figure 2:
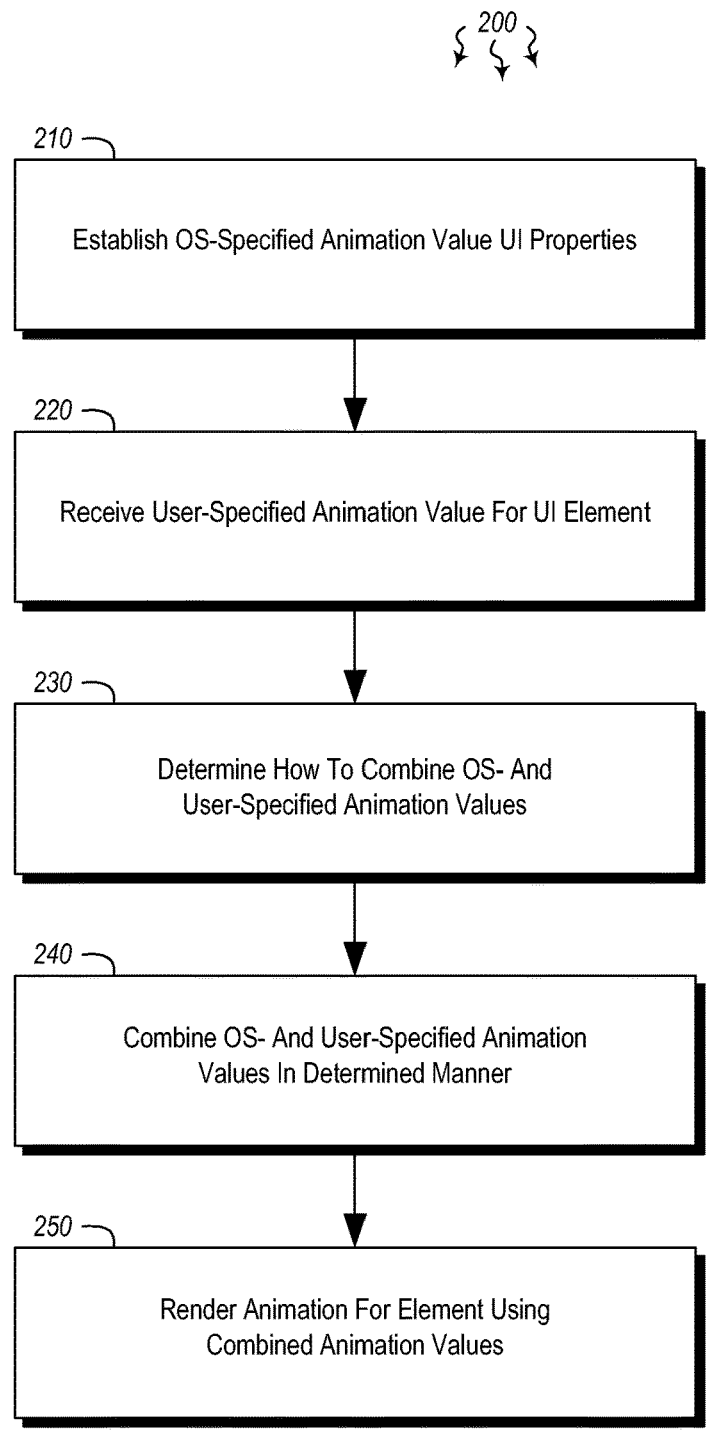
FIG. 2 illustrates a flowchart of an example method for rendering animations in a multi-layered animation system.
Figure 3:
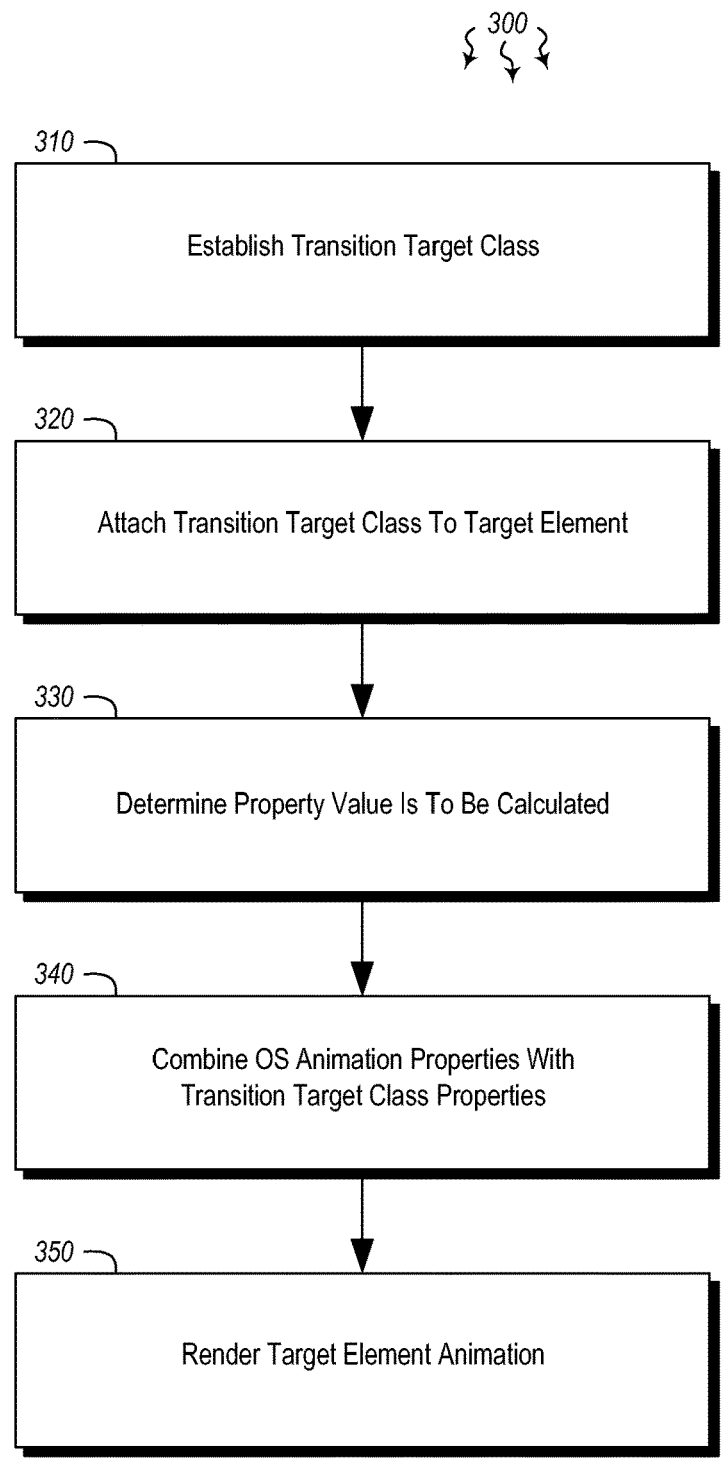
FIG. 3 illustrates a flowchart of an example method for rendering an element with an animation that uses multiple levels of animation properties.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for rendering animations in a multi-layered animation system. The method 200 will now be described with frequent reference to the components and data of environment 100.

Method 200 includes an act of establishing an operating system (OS)-specified animation value for at least one property of a user interface (UI) element that is to be animated (act 210). For example, computer system 101 may establish OS-specified animation values 113 for element properties 112 of the various displayed elements 111. Thus, each element property (e.g. opacity, coordinate position, size, or other features) may be animated separately according to the specified animation values. Each animation value may be specifically and individually editable by a software developer or other user. The OS may provide various element property values that, in some case, are editable (and in some cases, not editable) and customizable by the developer. In this manner, when the values are thus modified, the element property values' corresponding animations are updated, and the updated values are used the next time the element is animated. In some cases, the degree to which an element may be edited is customizable. Thus, a developer may specify (and limit) which animation values are available for customization to ensure a specified level of performance Method 200 next includes an act of receiving a user-specified animation value for at least one property of the UI element that is to be animated (act 220). For example, computer system 101 may receive user-specified animation value 106. This user-specified animation value may be sent to the animation value combining module which determines, based on which specific UI element is being combined, how to combine the OS-specified animation value and the user-specified animation value (act 230). In some cases, the OS-specified and user-specified values may be combined in such a manner to avoid conflicts between OS-specified animation values and user-specified animation values. In other cases, the OS-specified animation values and the user-specified animation values are logically combined based on the type of animation value (e.g. opacity or coordinate position).

In some embodiments, the logical combination for an opacity animation value consists of multiplying the OS-specified opacity animation value and the user-specified opacity animation value. The combined value of the opacity is thus the OS value multiplied by the user-specified value. This value is used as the new opacity value when the animation is rendered. The logical combination for a clipping animation value may consist of selecting the clipping animation value that has the smallest amount of clipping. Thus, if the OS value has the lower clipping value, it will be chosen, and vice versa.

Continuing, the logical combination for a translation animation value consists of adding the OS-specified translation animation value and the user-specified translation animation value. The translation animation value, as used herein, refers to the elements coordinate (X, Y) position on the screen. Thus, the OS-specified coordinates and the user-specified coordinates are added together and the element is displayed at the new position indicated by the added translation animation values. For a scale animation value, the logical combination consists of adding the OS-specified scale animation value and the user-specified scale animation value. The scale animation value, as used herein, refers to the relative size of the element. Thus, the size (scale) indicated by the operating system and the scale indicated by the user are added together to determine the new animation. The logical combination for a rotation animation value comprises adding the OS-specified rotation animation value and the user-specified rotation animation value. The rotation value indicates to what degree the element is to be rotated during the animation (e.g. 360 degrees). These user and OS values are added to determine the new rotation animation value.

Method 200 also includes an act of combining the OS-specified animation value and the user-specified value for the UI element in the determined manner (act 240). Thus, the animation value combining module 115 combines the OS-specified animation value 113 and the user-specified animation value 106 in the logical manner determined above. It will be noted that while the logical combination of values is specified for a few select animation values above, substantially any kind of animation values may be used and combined. In some embodiments, multiple animation layers may be combined. For instance, an OS layer, a user-specified layer and an animation library layer may all be combined by the animation rendering module 120. Other layers may also be combined as desired by the user or application developer. Moreover, in some cases, one or more third party animation libraries may be swapped in and implemented to control the feel of the software application. These third party libraries may specify different animation values that may be added (or may supersede) OS-specified animation values.

Method 200 then includes an act of rendering the animation for the element using the combined animation values (act 250). The animation is thus rendered by animation rendering module 120 using the combined animation values 116. These combined animations may be rendered one at a time, or multiple at a time. The combined values may be applied for each animation going forward indefinitely, or may just be applied for a user-specified amount of time. Thus, based on the type of animation to be performed, the animation values may be logically combined and used to render the corresponding user interface elements on display 130.

Figure 4:
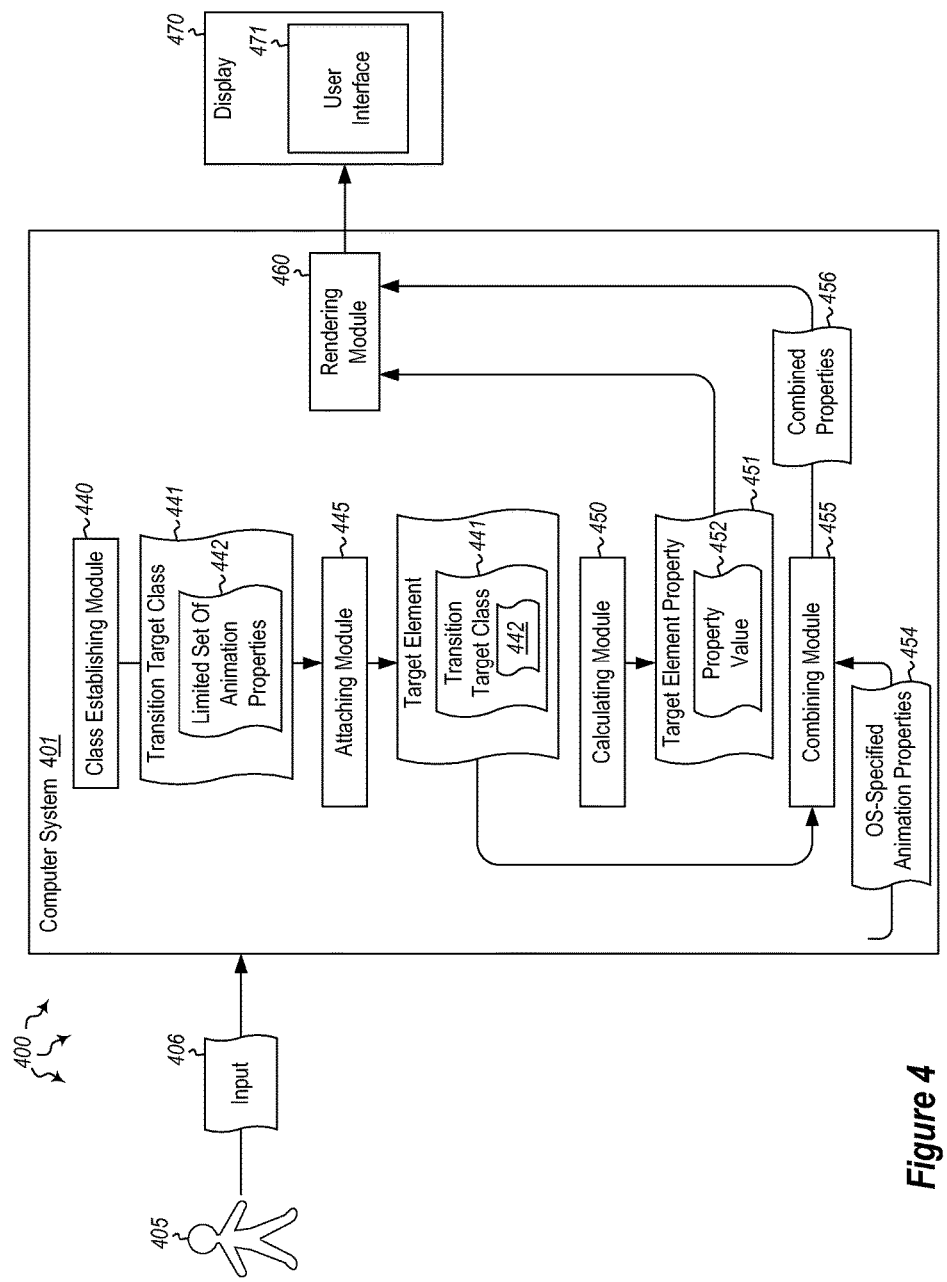
FIG. 4 illustrates an alternative computer architecture in which an element may be rendered with an animation that uses multiple levels of animation properties.

FIG. 3 illustrates a flowchart of a method 300 for rendering an element with an animation that uses multiple levels of animation properties. The method 300 will now be described with frequent reference to the components and data of environment 400 of FIG. 4.

Method 300 includes an act of establishing a transition target class that provides a limited set of animation properties that the operating system (OS) allows to be animated (act 310). For example, class establishing module 440 may establish transition target class 441. As used herein, a transition target class refers to a class of animation properties that are used with a target element that is to be transitioned or animated. The transition target class includes a limited set of animation properties that correspond to that class. This limited set of properties are those properties that the operating system allows to be selected and customized by a user. Thus, at least in some embodiments, the OS may restrict which animation properties are allowed to be changed by a user (e.g. by input 406 from user 405). In some cases, the animation properties in the transition target class are independently animated on a video stack. This may be enabled to ensure that a specified level of performance is maintained. As with the example above, various third party animation libraries may be swapped in and implemented to control the feel of the software application. Controlling the feel may include controlling how the animations are performed and how the animation values are combined.

Method 300 includes an act of attaching the transition target class to a target element that is to be animated on a software application user interface (UI) (act 320). For instance, attaching module 445 may attach the transition target class 441 to the target element 443 that is to be animated on user interface 471 of display 470. The target element then has the limited set of OS-specified animation properties. Calculating module 450 then determines that a value for an element property is to be calculated (act 330) and, upon calculating the value for the element property, combining module 455 combines one or more of the OS-specified animation properties 454 with the transition target class properties (act 340). Thus, for example, a user may set an opacity for a target element to be 0.5. The OS-specified animation value may be set to animate a fade in opacity from 1.0 (fully opaque) to 0. The values may be combined to fade the element from 0.5 to 0. Accordingly, the OS-specified animation values and the user-specified values (chosen from the limited set 442 in the transition target class 441) are combined 456 and sent to the rendering module 460 for rendering.

Method 300 further includes an act of rendering the target element with an animation that uses the combined OS and transition target class properties (act 350). For example, rendering module 460 may render target element 443 using an animation that includes the combined OS-specified and user-specified properties 456. The property values are combined in a logical way, as explained above. The logical way may be different for each type of animation property. For instance, animation values for opacity may be multiplied together, while translation and scale values may be added. Still other animation values may be logically evaluated and chosen based on which value is higher or lower (e.g. when selecting the clipping animation value, the value that has the smallest amount of clipping is selected). Many other animation property values may be used, singly or in combination with other animation values. How these are logically combined may be specified by the operating system, by the application's developer or by an end user. After the values are combined, they may be rendered on user interface 471 of display 470.

Accordingly, methods, systems and computer program products are provided which render animations in a multi-layered animation system. Moreover, methods, systems and computer program products are provided which render an element with an animation that uses multiple levels of animation properties.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for rendering animations in a multi-layered animation system, the method comprising:
   establishing a first value which is an operating system (OS)-specified animation value for at least one property of a user interface (UI) element that is to be animated;
   receiving a second value which is a user-specified animation value for the at least one property of the UI element that is to be animated;
   determining a manner of combining, based at least in part on the UI element property and at least in part on the type of animation value, which specifies how to combine the first OS-specified animation value and the second user-specified animation value;
   calculating a third value in the determined manner by combining the first OS-specified animation value and the second user-specified animation value for the UI element, wherein the third value is a combination of the first and second values calculated according to the determined manner of combining;
   sending the calculated third value to an animation rendering module for rendering the UI element; and
   rendering the animation for the element using the third value of the combined animation values.

2. The method of claim 1, wherein each animation value is individually editable by a software developer.

3. The method of claim 1, wherein the combined animation values avoid conflicts between OS-specified animation values and user-specified animation values.

4. The method of claim 1, wherein the OS-specified animation value and the user-specified animation value are logically combined based on the type of animation value.

5. The method of claim 4, wherein the logical combination for an opacity animation value comprises multiplying the OS-specified opacity animation value and the user-specified opacity animation value.

6. The method of claim 4, wherein the logical combination for a clipping animation value comprises selecting the clipping animation value that has the smallest amount of clipping.

7. The method of claim 4, wherein the logical combination for a translation animation value comprises adding the OS-specified translation animation value and the user-specified translation animation value.

8. The method of claim 4, wherein the logical combination for a scale animation value comprises adding the OS-specified scale animation value and the user-specified scale animation value.

9. The method of claim 4, wherein the logical combination for a rotation animation value comprises adding the OS-specified rotation animation value and the user-specified rotation animation value.

10. The method of claim 1, wherein the following animation layers are combined: OS layer, user-specified layer and an animation library layer.

11. The method of claim 1, wherein the OS provides one or more element property values customizable by the developer, such that when modified, the element property values' corresponding animations are customized.

12. The method of claim 1, wherein customizable animation values are limited to ensure a specified level of performance.

13. The method of claim 1, wherein one or more third party animation libraries are swapped in and implemented to control the feel of the software application.

14. A computer program product for implementing a method for rendering an element with an animation that uses multiple levels of animation properties, the computer program product comprising one or more computer-readable storage devices having stored thereon computer-executable instructions that, when executed by one or more processors of the computing system, cause the computing system to perform the method, the method comprising:
- establishing a transition target class that provides a limited set of animation properties that the operating system (OS) allows to be animated;
- attaching the transition target class to a target element that is to be animated on a software application user interface (UI);
- determining that a value for an element property is to be calculated, the manner of calculation based at least in part on the element property and at least in part on a type of the value for the element property;
- calculating the value for the element property;
- upon calculating the value for the element property, combining one or more OS-specified animation properties with the transition target class properties;
- providing the combined properties to a rendering module for rendering the target element; and
- rendering the target element with an animation that uses the combined OS-specified and transition target class properties.

15. The computer program product of claim 14, wherein the animation properties in the transition target class are independently animated on a video stack.

16. The computer program product of claim 14, wherein one or more third party animation libraries are swapped in and implemented to control the feel of the software application.

17. The computer program product of claim 14, wherein customizable animation values are limited to ensure a specified level of performance.

18. The computer program product of claim 14, wherein the OS provides one or more element property values customizable by the developer, such that when modified, the element property values' corresponding animations are customized.

19. A computer system comprising the following:
one or more processors;
system memory;
one or more computer-readable storage media having stored thereon computer-executable instructions that, when executed by the one or more processors, causes the computing system to perform a method for rendering animations in a multi-layered animation system, the method comprising the following:
- establishing a first value which is an operating system (OS)-specified animation value for at least one property of a user interface (UI) element that is to be animated;
- receiving a second value which is a user-specified animation value for the at least one property of the UI element that is to be animated;
- determining a manner of combining, based at least in part on the UI element property and at least in part on the type of animation value, which specifies how to combine the first OS-specified animation value and the second user-specified animation value such that the combined animation values avoid conflicts between OS-specified animation values and user-specified animation values;
- calculating a third value in the determined manner by combining the first OS-specified animation value and the second user-specified animation value for the UI element in the determined manner to produce the third value which is a combination of the first and second values calculated according to the determined manner of combining, wherein the OS-specified animation value and the user-specified animation value are logically combined based on the type of animation value;
- sending the third value to an animation rendering module for rendering the UI element; and
- rendering the animation for the element using the third value of the combined first OS-specified and second user-specified animation values.

20. The system of claim 19, wherein a plurality of different animation layers are combined including at least an OS layer, user-specified layer and an animation library layer.

* * * * *